United States Patent [19]

Fetouh

[11] Patent Number: 4,684,267
[45] Date of Patent: Aug. 4, 1987

[54] SPLIT BEARING ASSEMBLIES

[75] Inventor: Mohamed A. Fetouh, Troy, Mich.

[73] Assignee: General Motors Corporation, Detroit, Mich.

[21] Appl. No.: 771,662

[22] Filed: Sep. 3, 1985

Related U.S. Application Data

[62] Division of Ser. No. 627,028, Jul. 2, 1984, Pat. No. 4,569,109.

[51] Int. Cl.[4] .......................... F16C 9/02; F16C 9/04; F16C 33/14
[52] U.S. Cl. .................................. 384/294; 74/579 E; 384/429; 384/503
[58] Field of Search ............... 384/216, 276, 288, 294, 384/429, 430, 432–435, 503; 74/579 R, 579 E, 593, 594, 597, 598; 92/187–189; 29/156, 5 A, 413, 149.5 R

[56] References Cited

U.S. PATENT DOCUMENTS

| | | | |
|---|---|---|---|
| 1,226,820 | 5/1917 | Shultz | 384/432 |
| 1,399,001 | 12/1921 | Brownback | 384/432 |
| 1,831,325 | 11/1931 | Short | 74/579 E |
| 2,371,400 | 3/1945 | Mantle | 384/294 |
| 2,553,935 | 5/1951 | Parks et al. | 29/156.5 A |
| 2,703,263 | 3/1955 | Zernov . | |
| 3,285,098 | 11/1966 | Beveridge | 29/413 X |
| 3,818,577 | 6/1974 | Bailey et al. | 29/156.5 A X |
| 3,994,054 | 11/1976 | Cuddon-Fletcher et al. | 74/579 E |

FOREIGN PATENT DOCUMENTS 1147985  4/1969  United Kingdom ................ 384/294

Primary Examiner—Stuart S. Levy
Assistant Examiner—Thomas R. Hannon
Attorney, Agent, or Firm—Robert J. Outland

[57] ABSTRACT

Split bearing assemblies are disclosed having separable bearing caps for both single applications, such as connecting rods, and multiple applications, such as engine crankshaft supports, together with methods and apparatus for making such assemblies by integrally forming the caps with the main body and separating them by fracture separation. A two step separation method is disclosed with bore starter notches and semicircular die expanders that minimize split plane and bore distortion.

8 Claims, 15 Drawing Figures

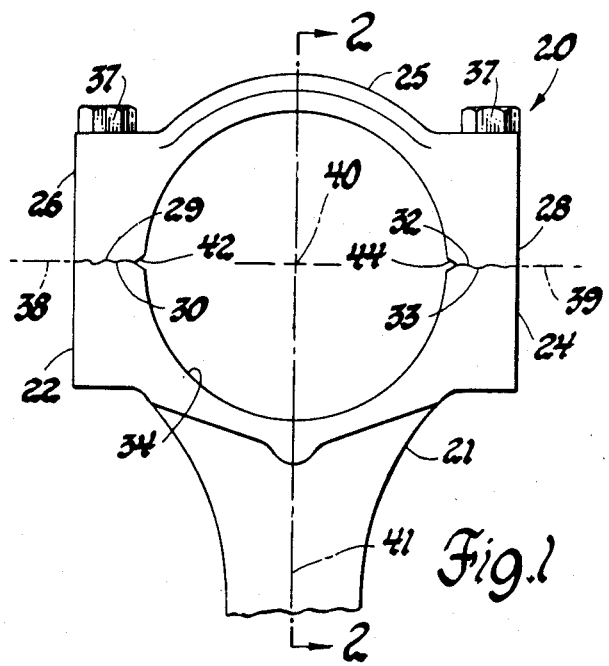
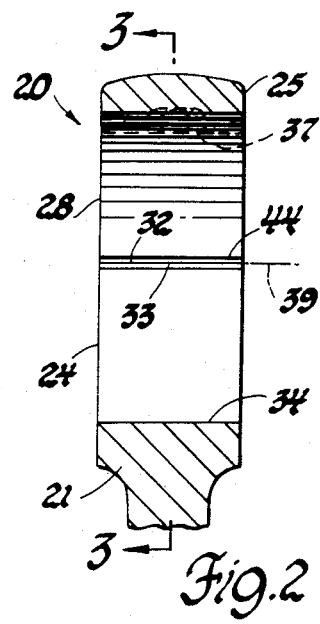
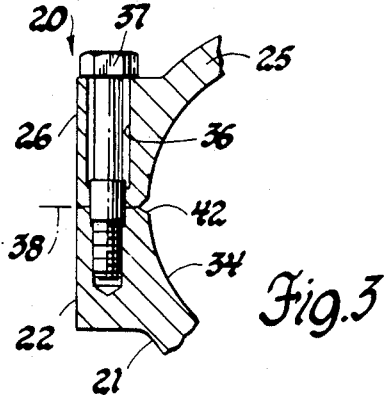
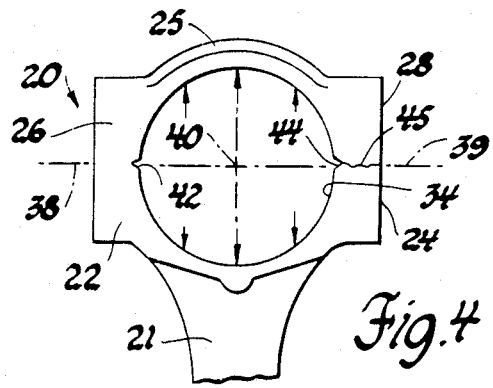
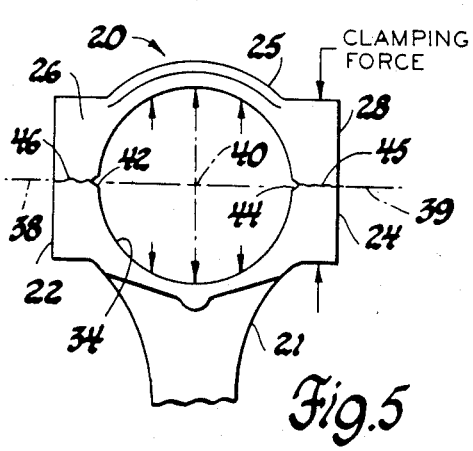
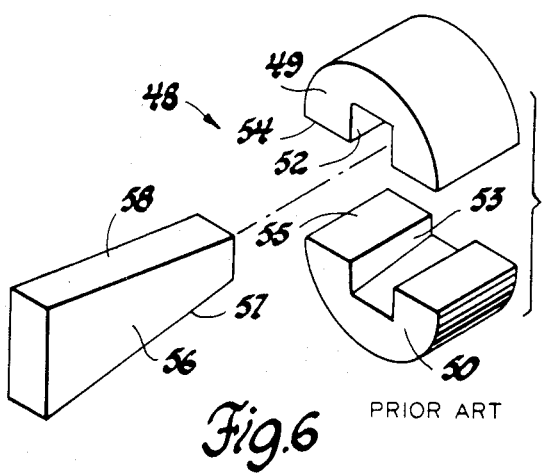

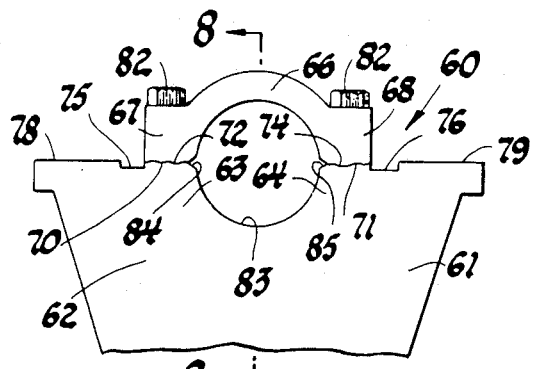
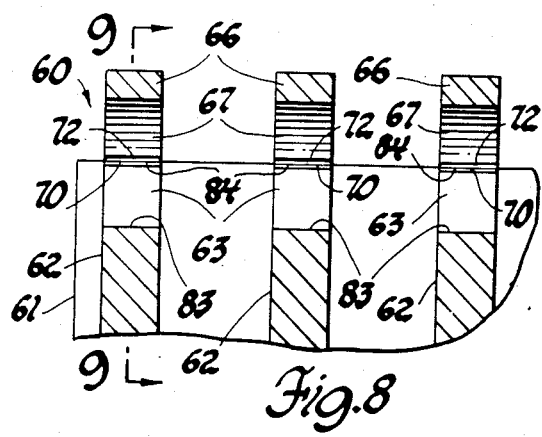
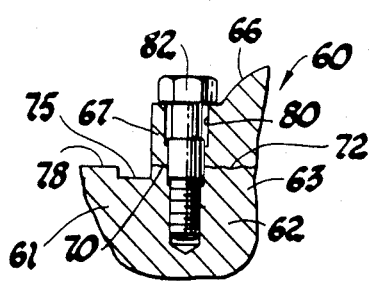
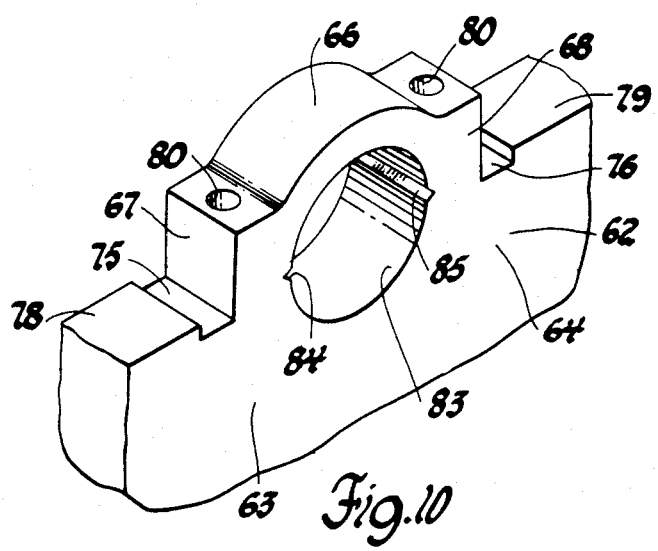
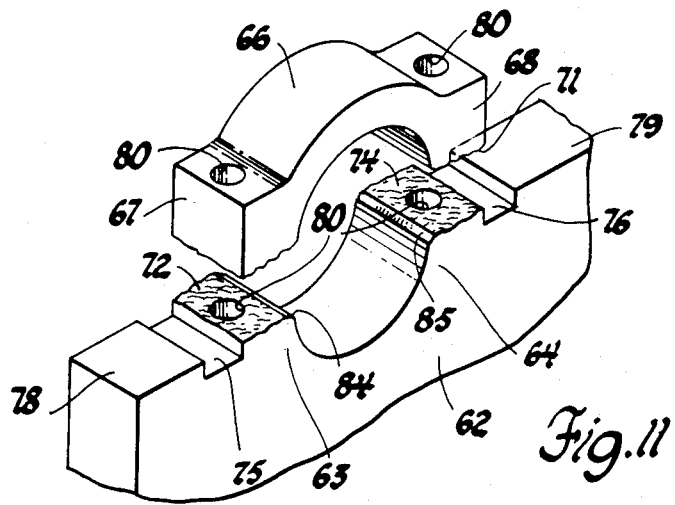

SPLIT BEARING ASSEMBLIES

CROSS REFERENCE TO RELATED APPLICATION

This is a division of U.S. patent application Ser. No. 627,028, filed July 2, 1984 and now U.S. Pat. No. 4,569,109.

TECHNICAL FIELD

This invention relates to split bearing assemblies of the type comprising a main body and a separable cap which are secured together to define a journal encircling bearing, or bearing receiving opening, for supporting a journal of a rotatable shaft, or the like. Further the invention relates to methods and means for making split bearing assemblies of the type described.

BACKGROUND

It is known in the mechanical arts to provide split bearing assemblies in various structural and machine components for supporting, or being supported by, the journals of rotating shafts and the like. Examples of applications for split bearing assemblies include engine crankshaft main and connecting rod bearing assemblies, some camshaft bearing assemblies, crank-supporting bearing assemblies for compressors, presses and other machines, and other rotatable shaft-supporting bearing assemblies, in all of which a removable saddle-like bearing cap is secured to a mating saddle-like main body to provide for the installation and removal of a rotatable shaft, an attached connecting rod, or another device.

Undoubtedly the most common method for manufacturing the separable main bodies and caps of split bearing assemblies is to separately form them by casting, forging or otherwise, whether they be for connecting rods, engine crankcases or other devices, and to subsequently bolt, or otherwise secure together, the caps and the main bodies. In many cases, finish machining of the journal encircling opening is completed after initial assembly of these components. This manufacturing method requires a large number of machining operations, as well as preliminary assembly and disassembly of the components, before the supporting or supported shaft may be installed.

Another known manufacturing method involves forming the main body and cap integral and separating them during manufacture by sawing or cutting away excess material provided to initially join the components. This method also requires machining of the connecting surfaces and other portions, generally including preliminary assembly.

In the case particularly of connecting rods, the prior art teaches other methods of forming the main body and cap as integral members and completely machining all necessary surfaces, including the journal encircling opening or bore, before separating the main body and cap members. The members are separated by material fracture techniques which involve fracturing the components along predetermined fracture planes, leaving interlocking rough surfaces that are capable of being re-engaged for assembly of the components into an operating assembly.

The prior art fracture techniques include various methods of weakening the separation planes, such as by drilling holes therein and/or providing weakening notches along one or more edges. Embrittlement of the material in the separating planes may also be provided for either by material selection, heat treatment (including hardening of various types), or by freezing the material to reduce its temperature below the embrittlement point.

The various types of prior fracture techniques introduce various problems, among which are reduction of the engageable surface area of the separated parts that reduces the allowable clamping load and, in some cases, the introduction of excessive bending of the separating parts which results in yielding deformation of metal along the edges that interfere with proper reassembly of the separated components. Deformation of the previously machined opening can also be a problem with some methods. Such difficulties limit the useable applications of fracture techniques and sometimes require additional machining operations to clean up or correct deformation and yielding problems.

SUMMARY OF THE INVENTION

The present invention provides methods and apparatus for making split bearing assemblies which substantially reduce the amount of machining over the most common methods. The methods and apparatus of the present invention utilize novel fracture techniques that eliminate problems of bending deformation during fracture and avoid the necessity for additional machining after separation. The novel methods are applicable not only to connecting rods and similar items to which fracture separation has been previously applied, but also to components having a plurality of bearing caps connected to a single body, such as an engine block, to provide a novel assembly. Novel splitting apparatus are provided for the manufacture of engine blocks and the like.

The various features and advantages of the method and apparatus as well as the novel structures involved will be more completely disclosed and understood in the following decsription of certain specific embodiments, chosen for purposes of illustration, together with the accompanying drawings.

BRIEF DRAWING DESCRIPTION

In the drawings:

FIG. 1 is a plan view of the crankpin-encircling end of a connecting rod, forming a split bearing assembly in accordance with the invention;

FIG. 2 is a longitudinal cross-sectional view from the plane indicated by the line 2—2 of FIG. 1 showing the interior of the bearing bore;

FIG. 3 is a fragmentary transverse cross-sectional view from the plane indicated by the line 3—3 of FIG. 2 showing the cap securing means;

FIGS. 4 and 5 are fragmentary plan views showing the results of sequential fracture separation steps of the manufacturing process;

FIG. 6 is a pictorial view illustrating known apparatus for performing a fracture separation process;

FIG. 7 is a fragmentary end view of the crankshaft carrying portion of the engine block, including attached main bearing caps;

FIG. 8 is a partial cross-sectional view from the plane indicated by the line 8—8 of FIG. 7 and showing the bearing bores;

FIG. 9 is a fragmentary cross-sectional view from the plane indicated by the line 9—9 of FIG. 8 showing the securing means;

FIGS. 10 and 11 are fragmentary pictorial views of one of the crankcase webs before and after the fracture separation steps of the manufacturing method;

DETAILED DESCRIPTION

Figure 12:
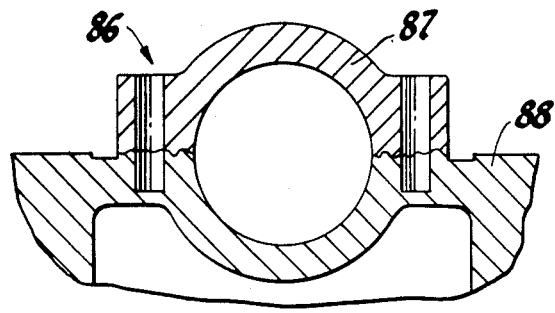
FIGS. 12 and 12A are fragmentary cross-sectional views through alternative embodiments of split bearing assemblies for supporting crankshaft main journals.

FIGS. 1-3 of the drawings illustrate the crankpin-encircling large end of a connecting rod assembly generally indicated by numeral 20 and of the type for use in internal combustion engines and the like. Connecting rod 20 includes a saddle-like main body 21 which is bifurcated to form first and second legs 22, 24 respectively and a removable saddle-like bearing cap 25 that is also bifurcated to define first and second legs 26, 28, respectively. The first legs 22, 26 of the body and cap have mating ends 29, 30 respectively and the second legs 24, 28 of the body and cap have mating ends 32, 33, respectively.

The mating ends 29, 30 and 32, 33 are secured in end-to-end engagement so that the saddle-like members 21, 25 define a journal receiving opening 34 in which a crankpin journal, not shown, may be received. Commonly, split insert bearing shells, not shown, are clamped within the journal receiving opening 34 to provide a suitable bearing surface for relative rotation of the crankpin, not shown, within the connecting rod.

As shown, the bifurcated legs 22, 24, 26, 28 of the body and cap incorporate integral bolt bosses through which bolt openings 36 extend from the distal ends of the cap legs 26, 28 through the mating ends 29, 30, 32, 33 and into the legs 22, 24 of the body to receive body bolts 37 that threadably engage the legs 22, 24 of the body and secure the legs 26, 28 of the cap in engagement therewith.

The mating ends 29, 30 and 32, 33 of the legs of the cap and body are comprised of rough, uneven mating surfaces formed by the fracture separation methods to be subsequently described and lying generally along split planes 38, 39 located on opposite sides of the opening 34. In the present instance the split planes lie on a common transverse diametral plane passing through the axis 40 of the pin encircling opening 34 and at right angles to the main longitudinal axis 41 of the connecting rod. It would be possible, however, to form the split planes 38, 39 outside of, or at angles to, the diametral plane. At the inner edges of the mating ends, along the split planes 38, 39, notches 42, 44 are formed in the periphery of and extending longitudinally for the length of the cylindrical opening 34 to initiate and locate the starting points of separation in the subsequent fracture steps and form the inner edges of the mating legs of the cap and body. The cap may be formed of any suitable material such as cast iron, steel or aluminum as will be subsequently more fully discussed.

The steps in a preferred form of method, according to the invention, for manufacturing the connecting rod assembly of FIGS. 1-3 are as follows. An integral unfinished connecting rod 20, including unseparated body and cap portions, 21, 25, respectively, with a pin-encircling opening defined thereby, is first formed in any suitable manner, such as, by casting, forging or the like. The integral rod is then machined to its finished dimensions by machining the bore 34, drilling and threading the bolt openings 36 and finishing the opposite sides of the connecting rod at the ends of the bore 34, if desired. Preferably, notches 42, 44 are also machined (or otherwise formed such as by casting or forging ) extending longitudinally along the opposite lateral sides of the bore 34.

Following finish machining, preparation is made for separating the bearing cap 25 from the main body 21. For this purpose, the material, at least that in the split planes 38 and 39, must be sufficiently brittle. If the material of the connecting rod is inherently brittle, such as cast iron and some aluminum alloys, no additional preparation may be required. Less brittle materials, such as steel, may require heat treatment or selective hardening by any suitable process to embrittle the material sufficiently along the split planes to avoid excessive yielding when fractured. As a third alternative, ductile or insufficiently brittle materials may be made temporarily brittle for processing purposes by reducing the temperature to a sufficiently low level. This may be done, for example, by soaking the parts in liquid nitrogen until they reach a temperature level of $-150°$ F. in preparation for the fracturing step.

When the material along the split planes is, or has been made, sufficiently brittle, force applying means are utilized to apply a separating force on opposite sides of the bore 34, acting outwardly in opposite directions parallel to the longitudinal axis 41 of the connecting rod, as shown by the arrows in FIG. 4 of the drawings. The application of force in this manner causes tension across the split planes extending outwardly from the notches on opposite sides of the opening 34. The tension causes a crack 45 to progress from the edge of either one of the notches 44 generally along the normal split plane 39 to the outer edge of the connecting rod, causing fracture separation of one pair of the mating legs, in this case 24 and 28, and forming their mating ends as previously described. (If desired the tension can be restricted to a selected one of the split planes. Also other means for limiting initial cracking to one pair of legs can be applied as will be discussed subsequently.)

After cracking of one pair of legs, continued force application along the connecting rod longitudinal axis, causing further expansion of the opening 34, would cause the formation of a second crack along the split plane 38, on the opposite side of the connecting rod and result in fully separating the cap and main body. However, experience has shown that completing the fracture in this manner may cause excessive bending of the material at the outer edges of the mating legs defined by the second crack. This bending results in deformation of the material along the outer edge which can interfere with proper mating engagement of the cap and main body upon attempted reassembly of the two members. Thus, it is advisable to provide means to prevent excessive opening of a space at the point of crack 45 which would allow the deviopment of bending stresses to the material in the opposite split plane.

This may be accomplished, as shown in FIG. 5, by applying a clamping force on opposite ends of the initially separated legs after the crack 45 has been formed. Continued application, or reapplication, of the longitudinal separating force against the cap and main body sides of the bore 34 is, then, effective to create a second crack 46, starting from the notch 42 and extending outwardly, generally in the split plane 38 to the outer edge of the rod, causing fracture separation of the mating legs 22, 26 and forming their mating ends.

Since the clamping force maintained against the already separated mating legs 24, 28 on the other side of the rod prevents their moving apart in a substantial degree, bending of the material at the ends of the legs 22, 26, defined by the opposite crack 46, is prevented and the problem of yielding deformation is avoided. Thus, upon assembly of the cap 25 to the main body 21, the installation of closely fitted body bolts 37 will be effective to positively realign the members in their original positions and allow the rough hills and interstices of the opposing fractured surfaces to tightly engage and form a securely clamped assembly.

If desired, it is contemplated that the fracture process may be accomplished with retaining bolts already loosely installed in the openings 36 to prevent full disassembly of the cap and main body. Thus, the parts are retained in assembly until such time as installation of the finished part in an actual engine or other mechanism is desired. In this manner, the uniquely matched cap and rod will be maintained together in proper orientation at all times until final assembly, reducing the possibility of assembly errors.

FIG. 6 illustrates known simple force applying means, in the form of a separating tool adapted to apply the desired separating force to the opposite sides of bore 34 of the cap and main body without substantial deformation of either member. Tool 48 consists of a pair of semi-cylindrical flat-sided pressure dies 49, 50 respectively containing longitudinal grooves 52, 53 extending along their flat sides 54, 55. When the dies are placed with their flat sides together, the grooves 52, 53 cooperate to form a rectangular opening for a separating wedge 56, the grooves having oppositely angled bottoms arranged to engage the angled sides 57, 58 of the wedge.

In use, the die elements 49, 50 are inserted into the opening 34 with their flat sides 54, 55 together and generally aligned with the plane 38 through the notches 42, 44. The wedge 56 is then inserted into the opening formed by the grooves with the wedge sides 57, 58 engaging the angled bottoms of the grooves. Force is then applied to the wedge 56 so as to force the dies 49, 50 apart and apply a separating force along a major portion of the longitudinally opposed interior surfaces of the opening 34. This in turn creates the desired tension across the split planes 38, 39 to develop the cracks 45, 46.

Limitation of the opening movement of the fractured portions of the cap and body after formation of the first crack 45 separating the mating legs may be accomplished in any suitable manner. For example, the ends of the bolt bosses in the mating legs could be clamped or placed within movement restricting jaws that prevent substantial further separation after a crack has been formed. Alternatively, the wedge 56 could be formed or moved in a manner that limits separating movement of the dies to a predetermined limited amount. In this way, bending and the resultant deformation of metal at the separated leg ends of the body and cap are avoided as previously described.

Referring now to FIGS. 7-9 of the drawings, there is shown an engine cylinder block assembly, generally indicated by numeral 60, formed with the methods and means of the present invention. Block 60 includes a main body 61 having, in the illustrated lower crankshaft supporting portion, a plurality of saddle-like webs 62 recessed or bifurcated to form first and second legs 63, 64, respectively. The assembly further includes a plurality of saddle-like bearing caps 66 bifurcated to form legs 67, 68 having ends 70, 71 that respectively engage ends 72, 74 of the block legs 63, 64 at each of the main transverse webs 62 of the crankcase portion.

Outwardly adjacent the legs 63, 64, the lower surface of the crankcase (shown inverted) is provided with longitudinal grooves 75, 76 that provide a break between the outer edges of the legs 63, 64 and the outer mounting surfaces 78, 79 of the cylinder block. As in the case of the connecting rod, the caps 66 and the associated legs 63, 64 of the webs 62 are provided with bolt openings 80 that receive shoulder bolts 82 to maintain the caps in engagement with the block upon assembly.

In manufacture, the block assembly 60 is begun by forming a block body 61 with the bearing caps 66 integral with the webs 62. Finish machining of the block assembly 60 is then completed while the body 61 and its individual webs 62 and associated main bearing caps 66 are integral as shown in FIG. 10.

After complete machining, the caps 66 are separated from their respective webs 62 by a process like that described with respect to the connecting rod embodiment of FIGS. 1-3. That is, force is applied across the pin receiving openings 83 of all the webs simultaneously, or sequentially, in directions perpendicular to the split planes inwardly defined by notches 84, 85. Upon separation of the mating legs on one side of the cap and body, a clamping force is applied to prevent substantial separation of the fractured legs while continued separating force is applied in the opening 83 to fracture the other pair of mating legs. The result is the separated cap and web construction shown in FIG. 11 which, with the addition of body bolts 82 in the bolt openings 80 may be assembled and secured in the manner illustrated in FIGS. 7-9.

Figure 12A:
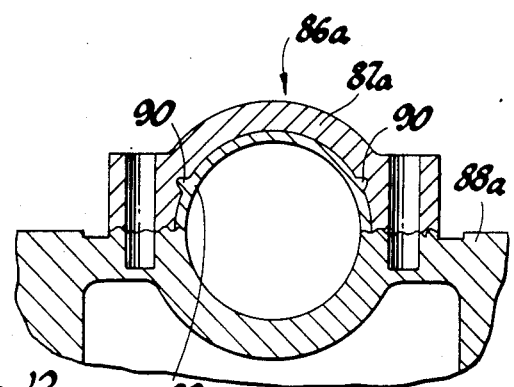

FIGS. 12 and 12a illustrate alternative embodiments of the split bearing assemblies 86, 86a, respectively, for supporting crankshafts or other shafts and which may be made by the methods and means of the present invention. In each case, a crankcase is constructed by placing a plurality of prefabricated bearing caps 87, 87a of one material, such as cast iron, in a mold in which the main body 88, 88a of a cylinder block or crankcase is subsequently cast using another material, such as aluminum. The separate components are integrally joined along a preroughened split line and finish machining is completed in the manner previously described. Subsequently, the caps 87, 87a are separated from the main body 88, 88a using fracture separation techniques in accordance with the invention as previously described.

In the FIG. 12 embodiment, the complete cap 87 is formed of one material such as cast iron. In the embodiment of FIG. 12A, a cast iron portion of the cap 87a has a larger recess to receive an inner lining 89 of aluminum, cast with the main body and retained within the cap by projections 90 extending into recesses of the cast iron portion of the cap. Upon separation of the cap from the main body 88a, the lining portion 89 is retained within the cast iron cap 87a and is capable of acting as a bearing surface for lightly loaded shafts and the like.

Figure 13:
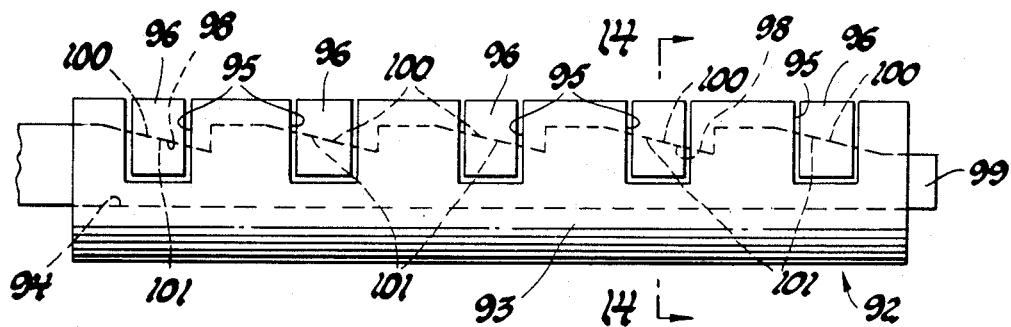
FIG. 13 is a side view of a novel gang splitting tool adapted for use in simultaneous fracture separation of multiple main bearing caps from their associated bodies.
Figure 14:
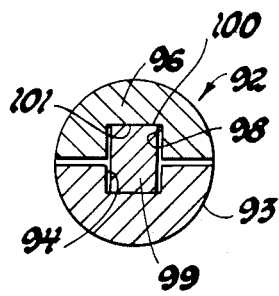
FIG. 14 is cross-sectional view from the plane indicated by the line 14—14 of FIG. 13 showing the splitting die construction.

FIGS. 13 and 14 illustrate a novel separating tool 92 for simultaneously separating the caps from the webs of a multiple-webbed cylinder block. Tool 92 includes a cylindrical body 93 having a longitudinal central opening 94 of rectangular cross-section intersecting longitudinally spaced laterally extending semicircular recesses 95 in which are disposed semicircular die members 96 having mating grooves 98. A longitudinally movable actuator 99 having a plurality of angularly disposed wedge surfaces 100 is received in the opening 94 with its wedge surfaces engaging the slanted bottoms 101 of the die grooves 98.

In operation, the tool 92 is inserted through the bores or openings 83 in the webs of an integral block and cap assembly with the dies 96 positioned within the individual bearing caps. The actuating member 99 is then forced in a direction to cause the wedge surfaces 100 to force the die members 96 outwardly, applying separating forces to all of the bearing caps simultaneously. The caps are, thereby, separated from their respective webs of the cylinder block using the two step fracture separation method previously described.

While the invention has been disclosed by reference to certain preferred methods and embodiments chosen for purposes of illustration, it should be understood that numerous changes could be made within the spirit and scope of the inventive concepts described. For example, changes could be made in the design of the components or in details of the fracture process. In addition, various forms of force applying tools or fixtures could be utilized. Possibilities for the latter include not only mechanical tension applying devices but also advanced technologies such as stress waves excited by sound, magnetic fields, mechanical means, etc. Accordingly it is intended that the invention not be limited to the described methods and embodiments, but that it have the full scope permitted by the language of the following claims.

As to the fracture process, it should be recognized that the clamping step may be accomplished in other ways than by applying a clamping force on the ends of the separated legs as described in the specification. Accordingly, any method whereby the separated pair of legs are maintained essentially in their mated positions is to be considered as within the claimed step of "clamping".

The embodiments of the invention in which an exclusive property or privilege is claimed are defined as follows:

1. A split bearing assemby comprising a rotatable shaft support having a main body with a plurality of saddle-like transverse webs and an integrally formed and subsequently separated bearing cap attached to each of said webs, wherein said caps and webs define a plurality of longitudinally spaced shaft supporting bearing openings, said caps engage their attached webs along mating fractured ends of associated legs of the caps and webs, and said shaft support further includes longitudinal notches in said bearing openings, said notches forming inner edges of said mating fractured ends of the associated legs.

2. A split bearing assembly as defined in claim 1 wherein the shaft support further includes side grooves extending longitudinally of the webs beside each bearing cap and defining outer edges of the mating fractured edges of the associated legs.

3. A split bearing assembly comprising a rotatable shaft support having a main body with a plurality of saddle-like transverse webs and an integrally formed and subsequently separated bearing cap attached to each of said webs, wherein said caps and webs define a plurality of longitudinally spaced shaft supporting bearing openings, said caps engage their attached webs along mating fractured ends of associated legs of the caps and webs, said caps are at least partially formed of a different material than the main body and said different materials of the caps and body extend to said fractured ends.

4. A split bearing assembly having a saddle-like main body with first and second legs and an integrally formed and subsequently separated removable saddle-like bearing cap attached to the main body with first and second legs having fractured ends respectively secured in end-to-end engagement with mating fractured ends of the first and second legs of said body to define a journal receiving opening, said assembly being formed by a method comprising, initially forming the bearing assembly body and cap integral with their-mating leg ends integrally joined, said integral body and cap being in a relatively brittle condition, at least along generally predetermined split planes defining the leg ends on opposite sides of said opening, said body and cap having essentially their assembled final dimensions, with said opening being centered on an axis lying within said main body and said cap, generally between said split planes, separating the cap from the main body by fracturing the integral legs generally along said split planes on opposite sides of said opening to form said legs of the saddle-like cap and body, said first and second legs of the cap and body respectively comprising first and second pairs mateable along said split planes, wherein the fracturing step is accomplished by causing tension across the split plane of one of said mateable pairs of legs to fracture and separate the ends of the legs of said one pair at their respective split plane while limiting relative movement of the cap and body to avoid substantial bending or complete fracture of the other mateable pair of legs, clamping the separated pair of legs in substantially their mated position and causing tension across the split plane of the other mateable pair of legs to fracture and separate their ends at their split plane without substantial bending, thereby avoiding bending of the legs at the split planes and yielding deformation at the leg edges to thus provide the capability of mating reassembly without substantial dimensional change.

5. A split bearing assembly according to claim 4 and further comprising a pair of longitudinal notches along opposite sides of said opening and defining inner edges of said fractured ends of the associated legs of the cap and body wherein longitudinal notches are formed across the inner edges of the split planes on the opposite sides of the opening prior to fracturing to initiate the fracture and positively locate the inner edges of the separated leg ends.

6. An assembly as in claim 5 wherein said split bearing assembly comprises a connecting rod.

7. An assembly as in claim 4 wherein said split bearing assembly comprises a connecting rod.

8. A split bearing assembly having a main body with a plurality of saddle-like transverse webs each with first and second legs and an integrally formed and subsequently separated removable saddle-like bearing cap attached to each of said webs with first and second legs having fractured ends respectively secured in end-to-end engagement with mating fractured ends of the first and second legs of their associated webs to define a plurality of longitudinally spaced shaft supporting bearing openings, said assembly being formed by a method comprising, initially forming the bearing assembly body webs and caps integral with their mating leg ends integrally joined, said integral webs and caps being in a relatively brittle condition, at least along generally predetermined split planes defining the leg ends on opposite sides of said openings, said webs and caps having essentially their assembled final dimensions, with said openings being centered on an axis lying within said main body webs and said caps, generally between said split planes, separating the caps from the main body webs by fracturing the integral legs generally along said split planes on opposite sides of said openings to form said legs of the saddle-like caps and webs, said first and second legs of the associated caps and webs comprising respectively first and second pairs mateable along said split planes, wherein the fracturing step is accomplished by causing tension across the split planes of one of each of said mateable pairs of legs connecting each cap with its respective web to fracture and separate the ends of the legs of said pairs at their respective split planes while limiting relative movement of the caps and webs to avoid substantial bending or complete fracture of the other mateable pairs of legs, thereafter clamping the separated pairs of legs in substantially their mated positions and causing tension across the split planes of the other mateable pairs of legs to fracture and separate their ends at their split planes without substantial bending, thereby avoiding bending of the legs at the split planes and yielding deformation at the leg edges to thus provide the capability of mating reassembly without substantial dimensional change.

* * * * *